April 9, 1957
G. K. THOMPSON
2,788,426
METHOD AND APPARATUS FOR TREATING MATERIALS
Filed Sept. 3, 1952
2 Sheets-Sheet 1
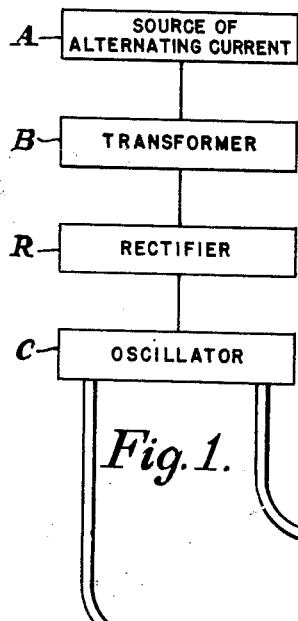
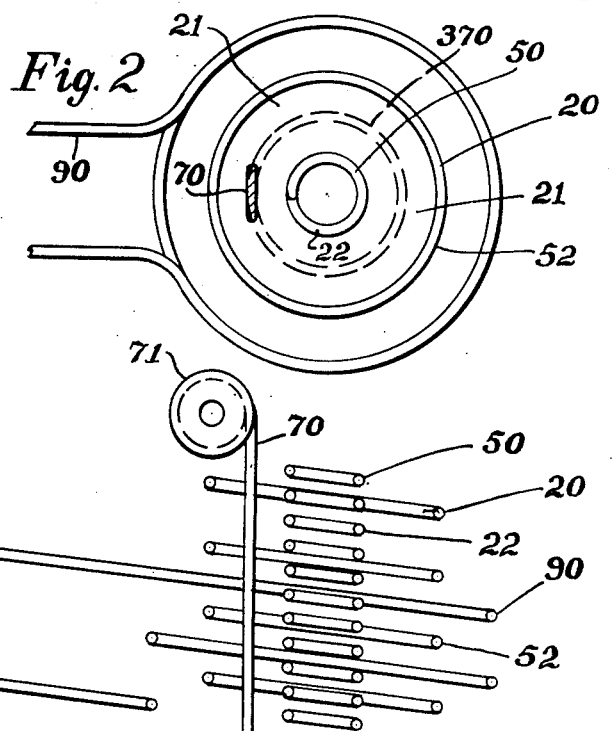
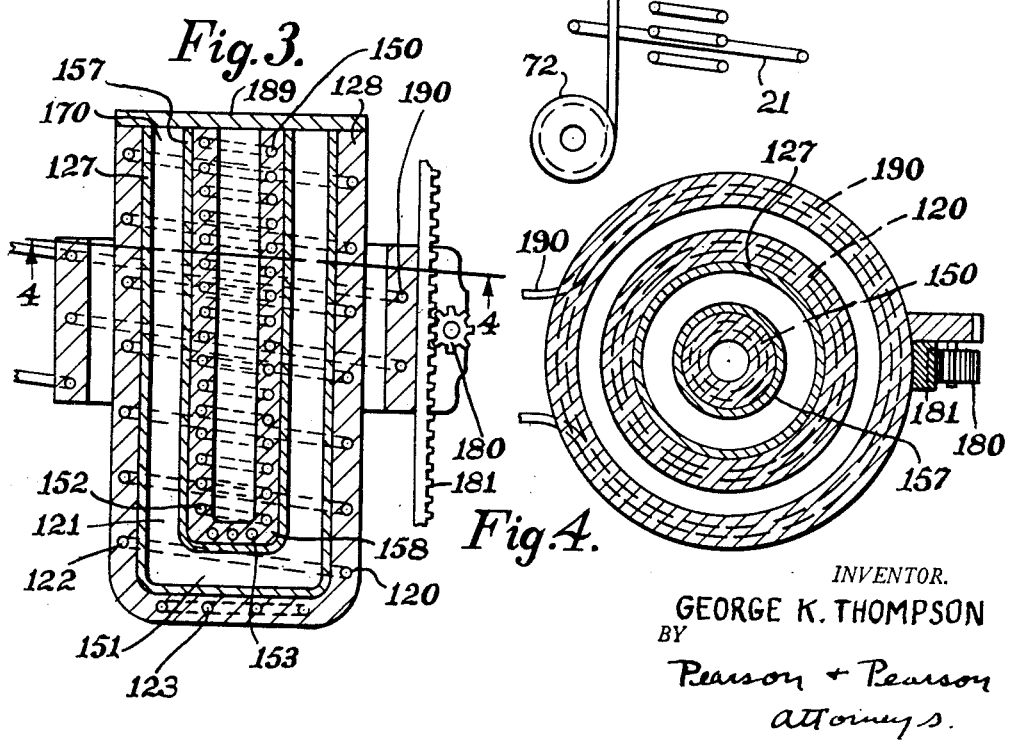
INVENTOR.
GEORGE K. THOMPSON
BY
Pearson + Pearson
attorneys.

April 9, 1957 G. K. THOMPSON 2,788,426
METHOD AND APPARATUS FOR TREATING MATERIALS
Filed Sept. 3, 1952 2 Sheets-Sheet 2
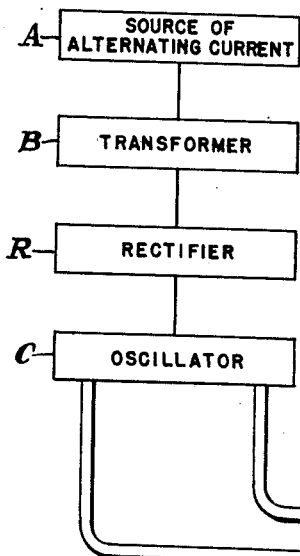
Fig.5.
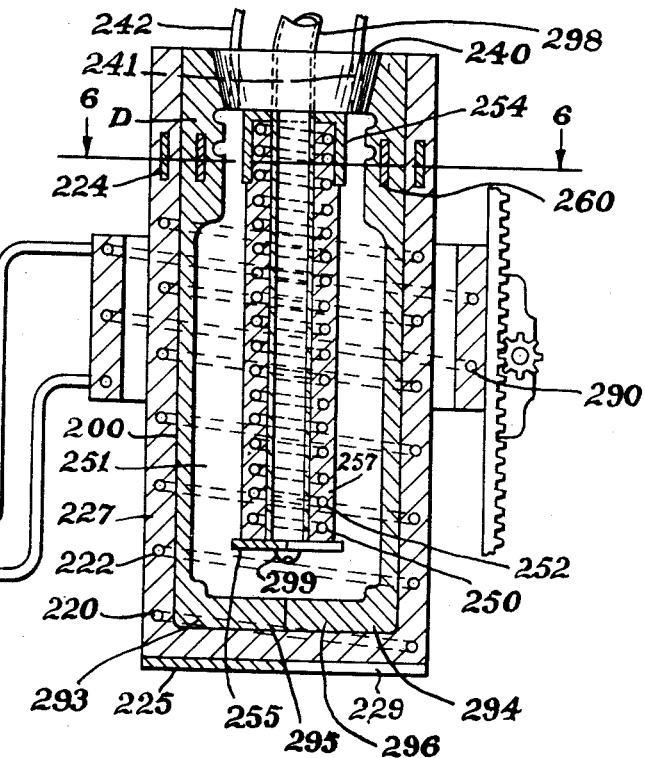
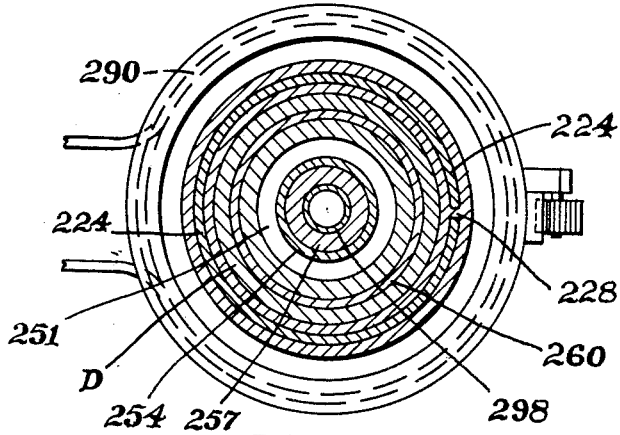
Fig. 6.
INVENTOR.
GEORGE K. THOMPSON
BY
Pearson + Pearson
attorneys

United States Patent Office 2,788,426
Patented Apr. 9, 1957

2,788,426

METHOD AND APPARATUS FOR TREATING MATERIALS

George K. Thompson, Lovell, Maine, assignor to Plastic Containers, Inc., Biddeford, Maine, a corporation of Maine Application September 3, 1952, Serial No. 307,944

19 Claims. (Cl. 219—10.75)

This invention relates to improved apparatus for, and methods of, treating non conductive substances by subjecting them to the action of an electrostatic field at a high frequency and/or to radiant heat produced electrically. Such treatment may be for drying, merging, sealing or fusing various non-conductive substances or for other desired purposes.

In the treatment of certain substances to convert them from non solid form to solid form, or to otherwise change their characteristics, for example, in molding tubes or containers of material such as cellulose acetate, it has been difficult to avoid the formation of blisters, bubbles or similar defects.

One of the objects of this invention is to provide an apparatus and method for solidifying such substances, or for fusing crystalline substances under controls which preclude ignition of any escaping volatile vapor and thus to avoid the formation of such defects.

Another object of the invention is to provide an electrostatic field which at a predetermined high critical frequency causes the non-conductive substances, exposed thereto to generate heat by dielectric loss and thereby soften or combine with similar adjacent material or to expel volatile matter residual within the material.

A further object of the invention is to cause the temperature of one inductor in the electrostatic field to gradually rise thereby providing controlled radiant heat to treat such substances in cooperation with the heat generated by the substance itself.

A still further object of the invention is to provide means for compensating for changes in impedance load in non-conductive substances which alter in structure under the influence of an electrostatic field.

Another object of the invention is to provide an apparatus and method capable not only of treating traveling webs or tubular formations of non-conductive substances but also of congealing liquid substances applied to a hollow mould of non-uniform shape and irregular contour.

In the drawings,

Fig. 1 is a side sectional view, partly diagrammatic of the invention forming a conduit through which a non-conductive substance may move.

Fig. 2 is a fragmentary plan view of the device shown in Fig. 1.

Fig. 3 is a fragmentary view, similar to Fig. 1 of the invention forming a vessel or retort for treating a non-conductive substance.

Fig. 4 is a plan view, in section, on line 4—4 of Fig. 3 of the apparatus shown in Fig. 3.

Fig. 5 is a view similar to Fig. 1 of the invention including a hollow receptacle for molding a non-conductive substance.

Fig. 6 is a plan view, in section, on line 6—6 of Fig. 5, of the device shown in Fig. 5.

As shown in Fig. 1 the apparatus of this invention includes a first conductively isolated inductor coil 20, a second conductively isolated inductor coil 50, centrally disposed within, and spaced from coil 20 and a coupling coil 90 encircling coil 20. Each inductor coil 20 or 50 is formed of a helically wound conductive strand 22 or 52 and the coils may be of circular cross section, as shown, or of other desired cross section, such as rectangular. By the term conductively isolated inductor coil, I mean a conductive strand, or strip, forming a helix, spiral or combination helix and spiral, the terminal ends thereof being spaced apart and not connected to any closed electrodynamic circuit. Coils 20 and 50 as well as coil 90 are preferably concentric. Coil 90 is preferably of only one or two convolutions or turns, while coils 20 and 50 have a considerably larger number of turns and are preferably coextensive to form therebetween an elongated annular substance receiving space 21. As indicated in Figs. 1 and 2 the strands 22 and 52 of the coils 20 and 50 are of small cross sectional area and the convolutions thereof are widely spaced thereby causing the distributed capacitance of the coils to be low. A substantial L/C ratio is thus secured.

An electrostatic field is created in the substance receiving space 21 between the inside of coil 20 and the outside of coil 50 by means of coupling coil 90. A source of alternating current A is provided connected to a transformer B which steps up the supply voltage to as much as several thousand volts. The transformer B is connected to a rectifier R which converts the alternating current to direct current and is in turn connected to an oscillator C producing high frequency energy. Coupling coil 90 is connected to oscillator C and encircles inductor coil 20, as well as inner coil 50, thereby establishing an electrostatic field in the space 21.

A web of non-conductive substance such as 70 may be continuously passed through space 21 for subjection to the high frequency electrostatic field therein, the web being mounted in any convenient manner such as on rolls 71, 72. Similarly such a web may be in the form of a hollow tube or cylinder 370 passing through the annular area 21 for electrostatic high frequency treatment as indicated in dotted lines in Fig. 2. Such high frequency electrostatic treatment may be for the purpose of drying the nonconductive substance, hardening the same, sealing or fusing ends thereof together, or for producing other desired changes in the characteristics of such nonconductive substances.

Preferably the first inductor coil 20 has a critical resonant frequency, for example, 65 megacycles, while the second inductor coil 50 has a different critical resonant frequency, for example, 95 megacycles. When placed in the relationship described herein and when encircled by coupling coil 90, connected to oscillator C, the two inductor coils in combination then become resonant to a third critical frequency equal to that of the oscillator, for example, about 40 megacycles. The two inductor coils thus form what I call a resonant conduit having a predetermined high critical frequency which excites the molecules of the nonconductive substance positioned therein to a predetermined and easily controlled amount or amounts.

The first inductor coil 20 preferably has a ratio of turns to the second inductor coil 50 which steps up the voltage supplied by the coupling coil 90. For example, the number of turns in coil 50 may be about four times greater than the number of turns in coil 20, as in the ratio of 40 turns to 9 turns thus increasing the supply voltage in the manner of a transformer.

The first inductor coil 20 preferably is formed of a conductive strand having negligible resistance while the second inductor coil 50 is formed of a conductive strand having substantial resistance. The inner coil 50 thus increases in temperature while exposed to the electrostatic field in an amount and to a point which can be accurately predetermined depending on the nature of the strand and the amount and duration of energy supplied thereto.

Not only is the second inductor coil preferably formed of a conductive strand with more resistance and more windings than the first inductor coil but preferably it is also of a material having the inherent characteristic that its reflected impedance changes in proportion to its temperature. The changes in impedance load as represented by the substance being treated, or by the mold structure shown in Figs. 5 and 6, are thus automatically compensated. "Nichrome V" or "Kanthal" are satisfactory materials for this purpose. The use of a conductive strand having substantial resistance and a predetermined change in coefficient or resistance, broadens the range or band of critical frequency for the two inductor coils and permits partially automatic control of the applied energy as the substance under treatment changes in its structural and electrical characteristics.

As shown in Figs. 3 and 4 my device may be made in the form of a vessel or retort having a coupling coil 190, a first inductor coil 120 and a second inductor coil 150, all similar to coils 90, 20 and 50. A conductive strand 123, in continuation of conductive strand 122 of coil 120 is provided, strand 123 being spirally wound in the same plane rather than helically wound to form a closed end to coil 120. Similarly a conductive strand 153, is provided, in continuation of strand 152 of coil 150, strand 153 being also spirally wound in the same plane to form a closed end to coil 150. A cup shaped substance receiving space is thus formed between the inside of coil 120 and the outside of coil 150, comprising the annular space 121 and the space between spiralled strands 123 and 153 at 151.

As explained above, preferably the second inductor coil 150, and its spiralled bottom strand 153, have a larger number of turns and more resistance than coil 120, and its strand 123 to provide radiant heat in addition to the electrostatic treatment of the substance positioned in space 121 and 151. Coil 150 and strand 153 may also be of material capable of automatically compensating for changes in impedance load and temperature and both coils 120 and 150 are preferably of different critical frequencies thus forming what I call a resonant retort.

A lining of nonconductive imperforate material such as ceramic may be provided around the inside of a coil such as 20, or around the inside of a coil such as 120 and its spiralled strand 123, as indicated at 127 to prevent moisture from a substance such as 70 contacting the same. A similar lining may also be provided around the outside of a coil such as 50, or around the outside of a coil such as 150 and its strand 153, as indicated at 157, for the same purpose. Preferably, however, all of the inductor coils of my device, including any transverse extensions thereof which form a bottom, are imbedded in nonconductive material such as 158 and 128 shown in Fig. 3. The ceramic, or other substance, seals the windings against moisture, supports the windings against displacement and limits the gradual oxidation of the heated coil combining with oxygen in the air.

Coupling coil 190 is shown as located intermediate of the ends of coils 120 and 150 in which position the zones of high difference of potential are at the ends of the coils. Means are therefore provided, such as a power operated gear wheel 180 and a gear rack 181 for automatically traversing coil 90 lengthwise of the inductor coils whereby the zones of high difference of potential may be moved relative to the coils and to the substance 170 positioned in the substance receiving space 121 and 151, thus the substance 170 may be treated uniformly throughout or may be treated with disproportionate strengths of the electrostatic field as desired.

A cap 189 may be provided to fully enclose coils such as 120 and 150, or other convenient means may be provided, whereby the substance receiving space 121 and 151 is filled with a desired concentration of a gas to intensify the electrostatic field in space 121, 151. A gas such as "neon," argon or other ionizing gases which become conductive under potential stress may be introduced into the electrostatic field, circulated with any volatile matter from the substance, drawn off and salvaged for reuse. The ionized gas also alters the frequency characteristics of the resonant circuit and may be used to compensate for the changes in electrical characteristics of the substance under treatment thus controlling uniformity, acceleration or attenuation of the rate of treatment.

In Figs 5 and 6 my device is shown with a hollow mould positioned in the space between inductor coils so that a substance within the mould is subjected to an electrostatic field. A source A, transformer B, rectifier R and oscillator C, as well as coupling coil 290 are shown, the coil 290 being mounted to traverse automatically as explained above.

A first inductor coil 220 formed of a plurality of helical windings of conductive strand 222 encompasses a second inductor coil 250 formed of a plurality of helical windings of conductive strand 252. Capacitor plate means in the form of a conductive strip or band 224, of increased surface area, is positioned at one terminal end of coil 220 while such means in the form of a disc 225 is positioned at the opposite end of coil 220 to form a closed end to the coil. Strip 244 is split at 228 and disc 225 is radially split at 229 in order to prevent single turn short circuits. Instead of a disc 225, a flat spiral conductive strand with contiguous turns of diminishing diameter terminating in a small open loop at the centre can be used, such as shown as 153 in Fig. 2. The second inductor coil 250 also is provided with capacitor plate means in the form of a split strip 254 at the end adjacent strip 224 and a split disc 255 at the end adjacent disc 225. Coils 220 and 250 are preferably imbedded in ceramic walls at 227 and 257 and are spaced apart to create a space 251 therebetween when in the operating position of Fig. 5.

A hollow mould D is provided in this form of the invention, of non-conductive material, such as ceramic, and having its outside wall 200 slidably removable from within the inside of wall 227. The mould D may have any desired inside configuration, elliptical, rectangular, oval and round, for example, the shape of the thin walled bottle with a restricted threaded neck indicated in Fig. 5. A cap 240 is provided, upon which the second inductor coil 250 is mounted and the cap may have a perforation 241 for admitting vapor such as ionized gas and another perforation 242 for exhausting vapor.

To compensate for the thickness of various portions of the walls of the mould D, whereby a uniform rate of treatment is obtained throughout the substance to be treated therein, a wide comparatively thick metal strip, or insert, 260 is imbedded in the thicker portions of the walls of the mould. The strip 260 is shaped and positioned to increase the electrostatic effect an amount sufficient to compensate for the decreased effect caused by the thick portion of the mould walls. Similarly the strip 254 is positioned outwardly and the strip 255 is extended outwardly to overcome the effect of the thicker portions of the mould walls at the upper and lower ends of the article treated.

The mould D is formed of two halves 293 and 294 each having a half portion of a bottom wall at 295 and 296 integral therewith. As shown in dotted lines in Fig. 5, a spray pipe 298 may be attached to the cap 240 and pass through the centre of coil 250 to a spray head 299. As the spray head 299 is lowered into the mould D, it will thus cover the inner walls thereof with a thin film of the substance to be treated such as cellulose acetate from the neck portion to the bottom portion of the container. When the spray head is proximate the bottom, the cap 240 closes the mould at which time the spray is stopped and the electrostatic field excited by the oscillator C. The oscillation at the combined (or third) critical frequency of the resonant coils 220 and 250 causes the cellulose acetate, or other substance to generate heat within itself by increased molecular activity through dielectric loss and thus progressively expels the volatile matter therein. During the same period the first inductor coil 220 remains cool while the second inductor coil 250, because of its predetermined electric resistance, becomes heated to a temperature of 200 to 300°. The infrared energy radiated by coil 250 provides surface heat on the inner surfaces of the substance to be treated thus supplementing the heat generated within the substance itself. To intensify the effect of the applied energy, and to provide a treatment control factor ionized gas is introduced through the perforation 241 after the closing of the cap on the mould and is exhausted through perforation 242 together with the solvent evaporated from the substance.

To control the uniformity of treatment over the entire area treated, the coupling coil 290 is traversed along the coil 220 from an intermediate position towards one end of the coil and then returned to the opposite end. As explained above, the material of the second inductor coil, or resistive inductor, in part or in whole, compensates for the changing of the impedance load of the resonant circuit according to the original composition of the substance under treatment.

As shown in the drawings the coils of the device may be helical, spiral or combined helical and spiral in order to conform to the shape of the substance being treated. One of the principal advantages thereof is the complete absence of any leads to the coils thus permitting heat, or other treatment, at normally inaccessible portions of the substance being treated. I call the inductor coils, such as 20 and 50, "self resonant" since they are inherently resonant without the addition of capacitors or condensers. As also shown in the drawings the size and shape of the cross section and the number of windings of the conductive strands making up the coils may be varied to control the treatment effect thereof on the nonconductive or dielectric substance. For example, a smaller strand cross section with more windings is used on coil 50 to increase the resistance thereof and a flat split disc such as 224 is used on coil 220 to increase the surface area and form a capacitor plate.

I claim:

1. Apparatus for treating low loss dielectric substances, said apparatus comprising a first conductively isolated, self resonant inductor coil formed of a helically wound conductive strand and having a predetermined critical resonant frequency; a second, conductively isolated, self resonant inductor coil, centrally disposed within and spaced from said first coil and having a predetermined critical resonant frequency, said second coil being formed of a helically wound conductive strand and forming an annular substance-receiving space between the inside of the first coil and the outside of the second coil; a coupling coil, encircling, but conductively isolated from, said first and second coils for producing an electrostatic field of high frequency in the substance-receiving space between said first and second coils and a source of high frequency current in circuit with said coupling coil.

2. A combination as specified in claim 1 wherein said first and second inductor coils have a ratio of turns, relative to each other which steps up the voltage supplied thereto by said coupling coil.

3. A combination as specified in claim 1 wherein said first and second inductor coils are each self resonant at dissimilar critical frequencies, said critical frequencies being both dissimilar from the source frequency whereby said coils, when coupled, resonate to the source frequency.

4. A combination as specified in claim 1 wherein said second inductor coil is of a material inherently capable of altering its reflected impedance in proportion to its temperature and adapted to undergo a predetermined alteration of temperature when energized by said coupling coil.

5. A combination as specified in claim 1 plus a pair of integral conductive strand extensions, each spirally wound in a flat plane in continuation of one of the helically wound strands of each said inductor coil at one adjacent pair of ends thereof to form flat closed ends thereon with a substance-receiving space therebetween.

6. A combination as specified in claim 1 plus a pair of capacitor plates, each connected to, and extending laterally across one of the adjacent terminal ends of said first and second inductor coils at a spaced distance from the other.

7. A combination as specified in claim 6 wherein each said capacitor plate comprises a conductive disc connected to the helically wound conductive strand of one of said coils and radially split for preventing single turn short circuits.

8. A combination as specified in claim 1 plus an imperforate lining of nonconductive material entirely covering at least one wall of the substance receiving space between said first and second inductor coils.

9. A combination as specified in claim 1 plus a pair of imperforate walls of nonconductive material, each completely enclosing one of said inductor coils on opposite sides of said substance receiving space and embedding the same.

10. A combination as specified in claim 1 plus means for securing a relative traversing motion between said coupling coil and said first and second inductor coils.

11. Apparatus for treating low loss dielectric substances which apparatus comprises a generator of high frequency current; a coil system including a first conductively isolated inductor coil self resonant at a critical resonant frequency on one side of a substance receiving space and a second conductively isolated inductor coil self resonant at a critical resonant frequency on the opposite side of said substance receiving space, said first coil being inductively coupled to said second coil across said substance-receiving space and inductive coupling means for coupling said generator with said coil system.

12. Apparatus as specified in claim 11 wherein each of said inductor coils is resonant at a predetermined dissimilar critical frequency and said coil system is adapted to resonate at the frequency of said generator.

13. Apparatus as specified in claim 11 wherein each of said coils is self resonant at a predetermined critical frequency dissimilar from the other.

14. Apparatus as specified in claim 11 wherein each of said coils is self resonant at a predetermined dissimilar critical frequency and said coil system is adapted to resonate as a unit."

15. Apparatus as specified in claim 11 wherein said coupled coil system is adapted to be resonated by the generator."

16. The method of treating low loss dielectric substances which consists in producing between at least two self resonant, spaced apart, conductively isolated inductor coils each having a substantial L/C ratio and dissimilar critical frequencies, an electro-static field critically intense at a supply frequency and subjecting said substance to the action of said field between said coils."

17. The method defined in claim 16 plus the step of simultaneously raising the temperature of one of said conductively isolated coils to produce radiant heat.

18. The method defined in claim 16 plus the step of controlling the reflected impedance of one of said coils to compensate for the changing impedance load of the substance in said field caused by changing its characteristics during treatment.

19. The method defined in claim 16 plus the step of traversing the zones of high difference of potential in said electrostatic field with relation to zones of various thickness of said substance to secure uniform exposure to said field.

(References on following page)

References Cited in the file of this patent

UNITED STATES PATENTS

| | | |
|---|---|---|
| 1,566,500 | Northrup | Dec. 22, 1925 |
| 2,181,871 | Conklin | Dec. 5, 1939 |
| 2,249,909 | Pisarev | July 22, 1941 |
| 2,280,771 | Dufour et al. | Apr. 28, 1942 |
| 2,285,370 | Staelin | June 2, 1942 |
| 2,359,285 | Bennett | Oct. 3, 1944 |
| 2,404,404 | Roberds | July 23, 1946 |
| 2,423,054 | Strickland, Jr. | June 24, 1947 |
| 2,454,708 | Middleton | Nov. 23, 1948 |
| 2,494,716 | McMahon et al. | Jan. 17, 1950 |
| 2,522,082 | Arnold | Sept. 12, 1950 |
| 2,575,251 | Arnold | Nov. 13, 1951 |
| 2,597,825 | Schroeder | May 20, 1952 |
| 2,647,200 | Redmond | July 28, 1953 |